(12) United States Patent
Yoshioka et al.

(10) Patent No.: US 12,226,727 B2
(45) Date of Patent: Feb. 18, 2025

(54) HONEYCOMB FILTER

(71) Applicant: NGK Insulators, Ltd., Nagoya (JP)

(72) Inventors: Fumihiko Yoshioka, Novi, MI (US); Yudai Kurimoto, Shanghai (CN)

(73) Assignee: NGK INSULATORS, LTD., Nagoya (JP)

(*) Notice: Subject to any disclaimer, the term of this patent is extended or adjusted under 35 U.S.C. 154(b) by 0 days.

(21) Appl. No.: 18/165,494

(22) Filed: Feb. 7, 2023

(65) Prior Publication Data
US 2023/0311049 A1   Oct. 5, 2023

(30) Foreign Application Priority Data

Mar. 30, 2022   (JP) .................... 2022-055095

(51) Int. Cl.
*B01D 46/24* (2006.01)

(52) U.S. Cl.
CPC ... *B01D 46/2484* (2021.08); *B01D 46/24491* (2021.08); *B01D 46/2459* (2013.01); *B01D 46/2474* (2013.01); *B01D 46/2482* (2021.08); *B01D 46/249* (2021.08); *B01D 46/2494* (2021.08); *B01D 2279/30* (2013.01)

(58) Field of Classification Search
CPC .......... B01D 46/2484; B01D 46/24491; B01D 46/24; B01D 46/82; B01D 46/249; B01D 46/2494; B01D 46/2459; B01D 46/2474; B01D 2279/30; B01D 46/2462; B01D 46/2498; B01D 46/2429; B01D 46/2444; B01D 46/247; B01D 46/00; B01D 46/0005; B01D 46/59; B01D 46/24492; B01D 46/2425; B01D 46/2478; F01N 3/0222; F01N 2330/34; F01N 2330/38; F01N 3/2828
USPC ................................... 55/523, 484
See application file for complete search history.

(56) References Cited

U.S. PATENT DOCUMENTS

| 8,211,526 B2 * | 7/2012 | Nagata | B01D 46/2484 428/116 |
| 2005/0076627 A1 * | 4/2005 | Itou | B01D 46/2478 55/523 |
| 2005/0129907 A1 * | 6/2005 | Yamaguchi | B28B 11/006 428/116 |

(Continued)

FOREIGN PATENT DOCUMENTS

| EP | 1418032 A2 * | 5/2004 | ........ B01D 46/2418 |
| JP | 2002-309922 A | 10/2022 | |

*Primary Examiner* — Robert A Hopkins
(74) *Attorney, Agent, or Firm* — BURR PATENT LAW, PLLC (57) ABSTRACT

A honeycomb filter includes a honeycomb structure body that has porous partition walls disposed so as to surround cells, and plugging portions that are disposed at any one of the ends on the inflow end face and the ends on the outflow end face. A cross-sectional shape of each of the inflow cells is octagonal and a cross-sectional shape of each of the outflow cells is quadrangular. An area ratio (S1/S2) of a cross-sectional area S2 of each of the outflow cells to a cross-sectional area S1 of each of the inflow cells is 1.40 to 2.20. The plugging portions have convex portions that protrude from the end faces on which the plugging portions are disposed, toward the outer sides, and have a protruding height H of 0.3 to 3.0 mm, and the plugging portions have a plugging depth L of 4.0 to 9.0 mm.

3 Claims, 5 Drawing Sheets (56) References Cited

U.S. PATENT DOCUMENTS

| | | | |
|---|---|---|---|
| 2011/0036080 A1* | 2/2011 | Beall | B01D 46/2425 264/630 |
| 2018/0326341 A1* | 11/2018 | Kato | B01D 46/2484 |

* cited by examiner

HONEYCOMB FILTER

RELATED APPLICATIONS

The present application is an application based on JP 2022-055095 filed on March 30/2022 with Japan Patent Office, the entire contents of which are incorporated herein by reference.

BACKGROUND OF THE INVENTION

Field of the Invention

The present invention relates to a honeycomb filter. More specifically, the present invention relates to a honeycomb filter having low pressure loss, excellent erosion resistance of the plugging portions arranged so as to plug open ends of cells, and also excellent thermal shock resistance.

Description of the Related Art

Conventionally, a honeycomb filter using honeycomb structure has been known as a device for trapping a particulate matter in a exhaust gas discharged from an internal combustion engine such as an engine of an automobile, or a device for purifying toxic gaseous components such as CO, HC and NOx (see Patent Document 1). The honeycomb structure includes partition walls made of porous ceramics such as cordierite and a plurality of cells defined by the partition walls. A honeycomb filter includes such a honeycomb structure provided with plugging portions so as to plug open ends on the inflow end face and the outflow end face of the plurality of cells alternately. In other words, a honeycomb filter has inflow cells that are open on the inflow end face and are plugged on the outflow end face and outflow cells that are plugged on the inflow end face and are open on the outflow end face, and these inflow cells and outflow cells are alternately arranged with the partition walls interposed therebetween. In the honeycomb filter, the porous partition walls serve as a filter for trapping particulate matter in exhaust gas. Hereinafter, particulate matter included in exhaust gas may be referred to as "PM". "PM" is an abbreviation for "particulate matter."

Purifying of exhaust gas by the honeycomb filter is performed as follows. First, the honeycomb filter is arranged such that its inflow end face is located upstream of exhaust system from which exhaust gas is discharged. Exhaust gas flows into the inflow cells from the inflow end face of the honeycomb filter. Exhaust gas flowing into the inflow cells passes through the porous partition walls, flows into the outflow cells, and is discharged from the outflow end face of the honeycomb filter.

When PM in exhaust gas is continuously removed by the honeycomb filter, a PM such as soot is deposited inside the honeycomb filter, so that purifying efficiency is lowered and pressure loss of the honeycomb filter is increased. Therefore, for example, in a purifying device using a honeycomb filter, "regeneration processing" for burning PM deposited inside the honeycomb filter is performed.

[Patent Document 1] JP 2002-309922

In recent years, a honeycomb filter for purifying an exhaust gas emitted from an engine such as an automobile is required to reduce pressure loss in order to improve fuel efficiency of the automobile. As one of the measures to reduce pressure loss, the study on "increasing porosity" which further increases porosity of the honeycomb filter compared with the conventional one has been advanced.

However, when the plugging material constituting the plugging portions becomes high porosity with the increase in porosity of the honeycomb filter, there is a problem that heat capacity of the entire honeycomb filter becomes low and the honeycomb filter is easily damaged in regeneration process as described above.

In addition, there is another problem that in the honeycomb filter, when a foreign substance such as metallic particles generated from an engine or an exhaust pipe comes into the flow of exhaust gas, the foreign substance collides with the plugging portions of the honeycomb filter, and the plugging portions where the foreign substance collides are worn. In particular, the plugging portions corresponding to the recent high porosity tends to be worn by the collision of foreign matters, and the above-described issues are more serious. Hereinafter, wear and scraping of the plugging portions or the like caused by foreign matter flying in exhaust gas flow may be referred to as "erosion".

The present invention has been made in view of the problems with the prior arts described above. The present disclosure provides a honeycomb filter having low pressure loss, excellent erosion resistance of the plugging portions and excellent thermal shock resistance.

SUMMARY OF THE INVENTION

According to the present invention, a honeycomb filter described below is provided.

[1] A honeycomb filter including:
a honeycomb structure body that is pillar-shaped and has porous partition walls disposed so as to surround a plurality of cells each of which serves as a fluid through channel extending from an inflow end face of the honeycomb structure body to an outflow end face of the honeycomb structure body, and plugging portions that are disposed at any one of the ends on the inflow end face and the ends on the outflow end face, of the plurality of cells, wherein, when cells of the plurality of cells having the plugging portions at the ends on the inflow end face are defined as outflow cells and cells of the plurality of cells having the plugging portions at the ends on the outflow end face are defined as inflow cells, in a cross section perpendicular to an extending direction of the plurality of cells of the honeycomb structure body, a cross-sectional shape of each of the inflow cells is octagonal and a cross-sectional shape of each of the outflow cells is quadrangular, except for cells of the plurality of cells disposed in outermost circumference of the honeycomb structure body, an area ratio (S1/S2) of a cross-sectional area S1 of each of the inflow cells having the octagonal cross-sectional shape to a cross-sectional area S2 of each of the outflow cells having the rectangular cross-sectional shape is 1.40 to 2.20, the plugging portions that seal the ends of the inflow cells each having the octagonal cross-sectional shape and the outflow cells each having the rectangular cross-sectional shape, have convex portions that protrude from the end faces on which the plugging portions are disposed, toward the outer sides of the honeycomb structure body in the extending direction of the plurality of cells, and the convex portions have a protruding height H of 0.3 to 3.0 mm when the end faces are considered as bottoms of the convex portions, and the plugging portions having the convex portions have a plugging depth L of 4.0 to 9.0 mm when the end faces are considered as starting points of the plugging portions.

[2] The honeycomb filter according to [1], wherein a thickness of the partition walls is 0.17 to 0.32 mm.

[3] The honeycomb filter according to [1] or [2], wherein a cell density of the honeycomb structure body is 30 to 62 cells/cm$^2$.

[4] The honeycomb filter according to any one of [1] to [3], wherein a porosity of the partition walls is 50 to 60%.

The honeycomb filter of the present invention is intended to achieve effects of low pressure loss, excellent erosion resistance of the plugging portions and excellent thermal shock resistance.

DESCRIPTION OF THE PREFERRED EMBODIMENTS

The following will describe embodiments of the present invention; however, the present invention is not limited to the following embodiments. Therefore, it should be understood that those created by adding changes, improvements or the like to the following embodiments, as appropriate, on the basis of the common knowledge of one skilled in the art without departing from the spirit of the present invention are also covered by the scope of the present invention.

Figure 1:
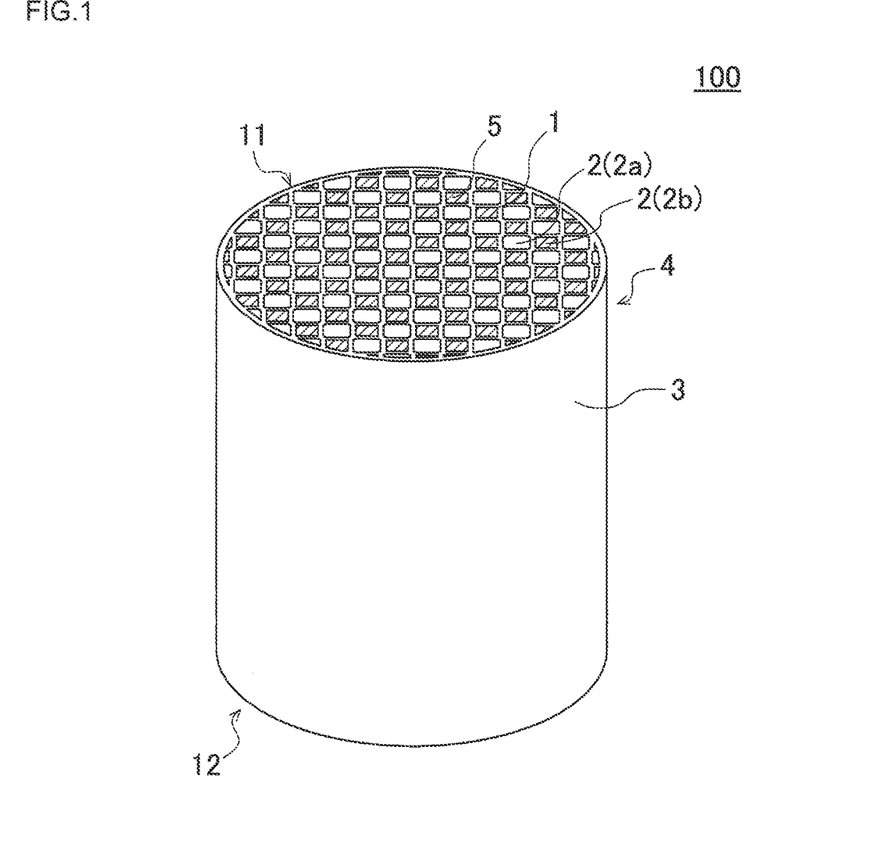
FIG. 1 is a perspective view schematically showing an embodiment of a honeycomb filter according to an embodiment of the present invention.
Figure 2:
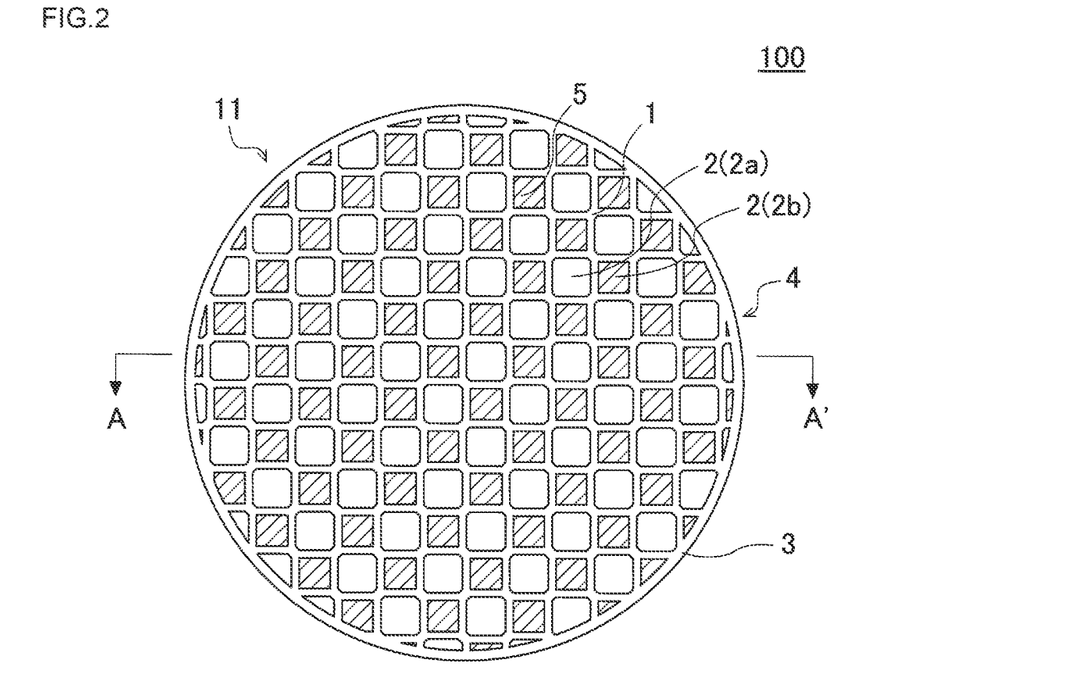
FIG. 2 is a plan view showing the inflow end face of the honeycomb filter shown in FIG. 1.
Figure 3:
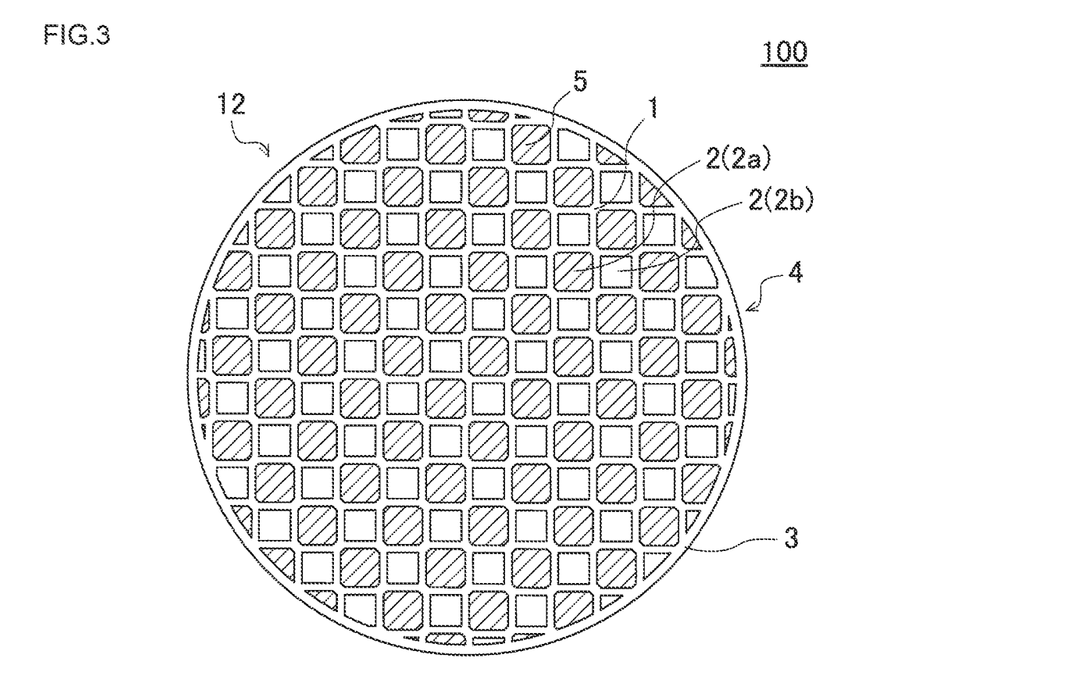
FIG. 3 is a plan view showing the outlet end face of the honeycomb filter shown in FIG. 1.
Figure 4:
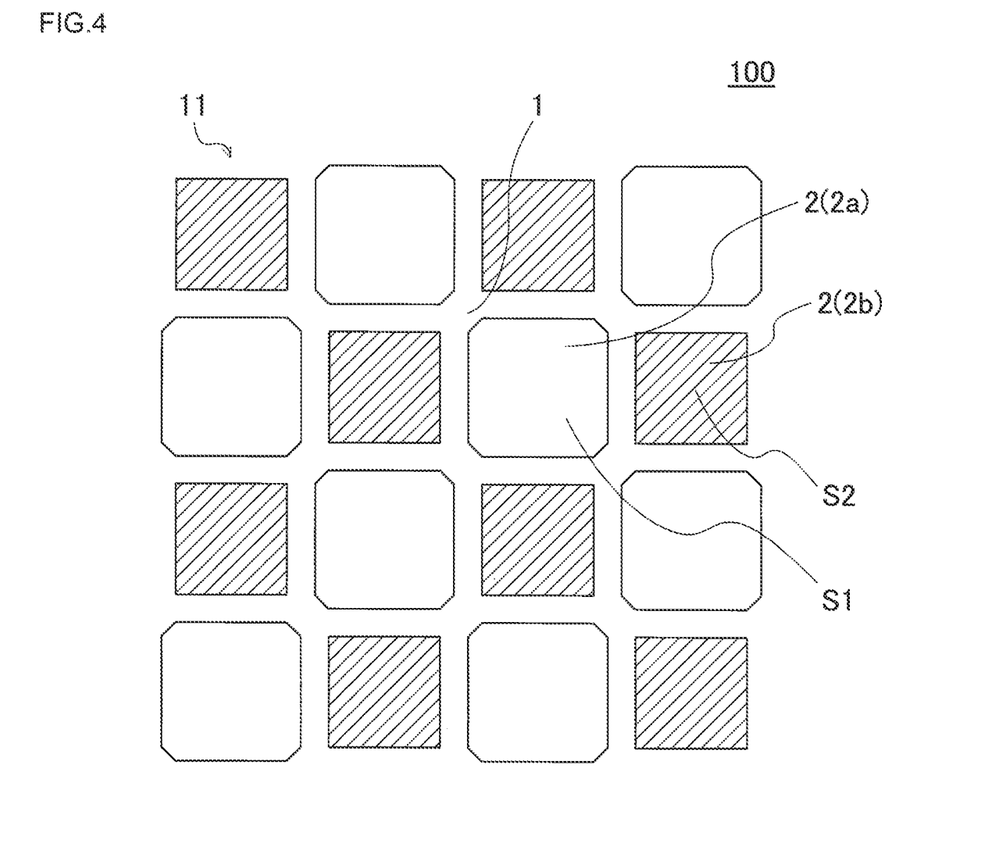
FIG. 4 is an enlarged plan view of a portion of the inflow end face of the honeycomb filter shown in FIG. 2.
Figure 5:
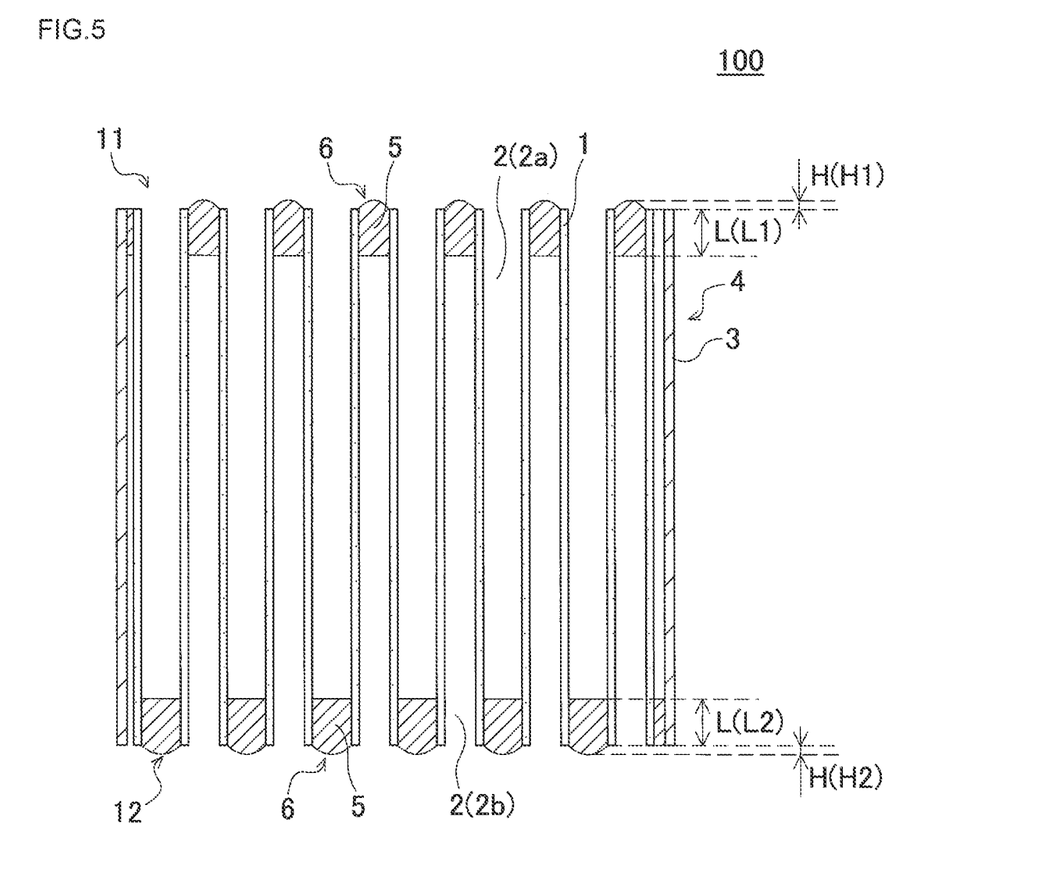
FIG. 5 is a cross-sectional view schematically showing A-A' cross section of FIG. 2.
Figure 6:
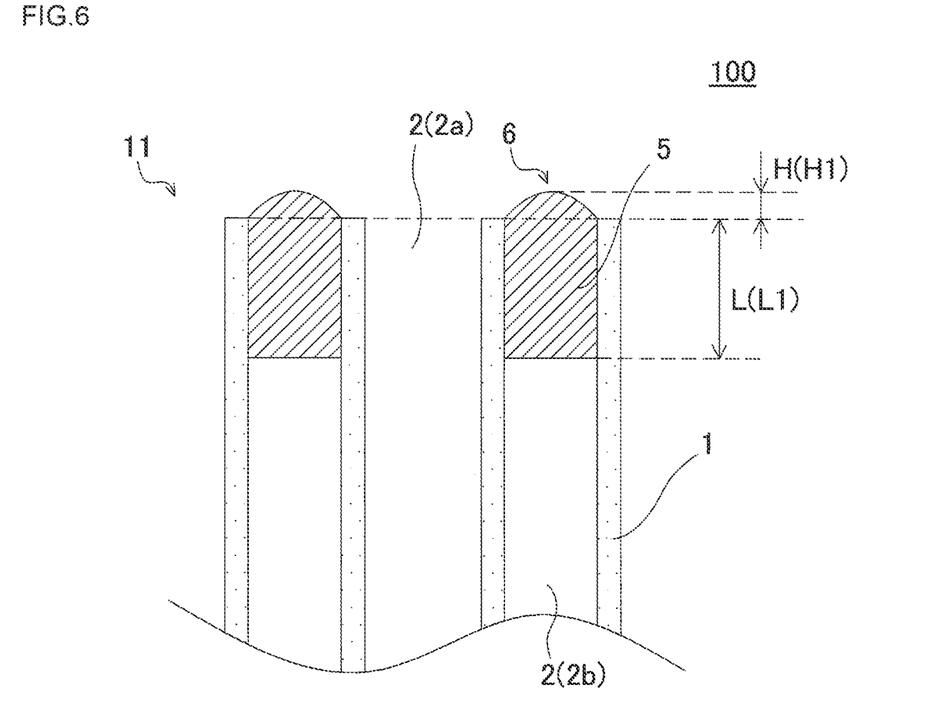
FIG. 6 is an enlarged sectional view of a portion of the inflow end face of the honeycomb filter shown in FIG. 5.

(1)Honeycomb Filter:

An embodiment of the present invention honeycomb filter is a honeycomb filter 100 as shown in FIGS. 1 to 6. FIG. 1 is a perspective view schematically showing a embodiment of a honeycomb filter according to an embodiment of the present invention. FIG. 2 is a plan view showing the inflow end face of the honeycomb filter shown in FIG. 1. FIG. 3 is a plan view showing the outflow end face of the honeycomb filter shown in FIG. 1. FIG. 4 is an enlarged plan view of a part of the inflow end face of the honeycomb filter shown in FIG. 2. FIG. 5 is a cross-sectional view schematically showing A-A' cross section of FIG. 2. FIG. 6 is an enlarged cross-sectional view of a portion of the inflow end face of the honeycomb filter shown in FIG. 5.

As shown in FIGS. 1 to 6, the honeycomb filter 100 includes a honeycomb structure body 4 and plugging portions 5. The honeycomb structure body 4 has the porous partition walls 1 disposed so as to surround a plurality of cells 2, each of which serves as a fluid through channel extending from an inflow end face 11 to an outflow end face 12 of the honeycomb structure body 4. The honeycomb structure body 4 is a pillar-shaped structure having the inflow end face 11 and the outflow end face 12 as both ends thereof In the present invention, the cells 2 refer to a space surrounded with the partition walls 1. The honeycomb structure body 4 of the honeycomb filter 100 further has a circumferential wall 3 disposed to encompass the partition walls 1 a circumferential side surface thereof.

The plugging portions 5 are disposed at any one of the ends on the inflow end face 11 and the ends on the outflow end face 12, of the cells 2 to plug the open ends of the cells 2. The plugging portions 5 is porous and made of a porous material (that is, a porous body). In the honeycomb filters 100 shown in FIGS. 1 to 6, predetermined cells 2 in which the plugging portions 5 are disposed at the ends on an inflow end face 11 and remaining cells 2 in which the plugging portions 5 are disposed at the ends on an outflow end face 12 are alternately arranged with the partition walls 1 interposed therebetween. Hereinafter the cells 2 having the plugging portions 5 at the ends on the inflow end face 11 may be called "outflow cells 2b". The cells 2 having the plugging portions 5 at the ends on the outflow end face 12 may be called "inflow cells 2a".

The honeycomb filter 100 has an octagonal cross-sectional shape of each of the inflow cells 2a and a quadrangular cross-sectional shape of each of the outflow cells 2b, except for the cells 2 disposed in outermost circumference of the honeycomb structure body 4, in a cross section perpendicular to the extending direction of the cells 2 of the honeycomb structure body 4. Hereinafter, the cells 2 in which the periphery of each of the cells 2 is surrounded by only the partition walls 1 may be referred to as "complete cells". On the other hand, when the honeycomb structure body 4 is provided with a circumferential wall 3 on the outer peripheral side surface, the cells 2 disposed on outermost circumference of the honeycomb structure body 4 (hereinafter, also simply referred to as "outermost circumference cells 2") are the cells 2 surrounded by the partition walls 1 and the circumferential wall 3. These cells 2 disposed on outermost circumference have a part of the periphery thereof which is partitioned by the circumferential wall 3, and are formed incompletely by missing a part of the complete cells. In the following, the cells 2 each of which has a periphery surrounded by the partition walls 1 and the circumferential wall 3 may be referred to as "incomplete cells", and the incomplete cells are not included in the cells 2 constituting the inflow cells 2a and the outflow cells 2b described above. Therefore, unless otherwise specified, the terms "inflow cells 2a" and "outflow cells 2b" simply refer to "inflow cells 2a" and "outflow cells 2b" which are complete cells.

The honeycomb filter 100 of the present embodiment has particularly major properties in shapes and cross-sectional areas of the inflow cells 2a and the outflow cells 2b as well as a configuration of the plugging portions 5 each of which is disposed at either end of each of these cells 2. That is, in the honeycomb filter 100 of the present embodiment, the area ratio (S1/S2) of the cross-sectional area S1 of each of the inflow cells 2a having an octagonal cross-sectional shape to the cross-sectional area S2 of each of the outflow cells 2b having a rectangular cross-sectional shape is 1.40 to 2.20. The plugging portions 5 that seal the ends of the inflow cells 2a and the outflow cells 2b have convex portions 6 that protrude from the end faces on which the plugging portions 5 are disposed, toward the outer sides of the honeycomb structure body 4 in the direction in which the cells 2 extend. Here, "the end face where the plugging portions 5 are disposed" refers to the outflow end face 12 of the honeycomb structure body 4 for the plugging portions 5 disposed at the end of the inflow cells 2a and the inflow end face 11 of the honeycomb structure body 4 for the plugging portions 5 disposed at the end of the outflow cells 2b. The convex portion 6 of the plugging portion 5 has a protruding height H of 0.3 to 3.0 mm, and the plugging portion 5 having the convex portion 6 has a plugging depth L of 4.0 to 9.0 mm. Here, the protrusion height H of the convex portion 6 refers to a height up to the top of the convex portion 6 when the end face (i.e., the inflow end face 11 or the outflow end face 12) of the honeycomb structure body 4 on which the convex portion 6 is disposed is considered as a bottom of the convex portion 6. The plugging depth L of the plugging portion 5 refers to a length (a length in the direction in which the cells 2 extend) of the plugging portion 5 filled in the cell 2 when the end face (i.e., the inflow end face 11 or the outflow end face 12) of the honeycomb structure body 4 on which the convex portion 6 is disposed is considered as a starting point of the plugging portion 5.

The honeycomb filter 100 of the present embodiment configured as described above has low pressure loss, excellent erosion resistance of the plugging portions 5, and excellent thermal shock resistance. In particular, by having the plugging portions 5 having the convex portions 6 as described above, a slope occurs at the end of the plugging portions 5 on the inflow end face 11, exhaust gas flowing from the inflow end face 11 flows smoothly into the inflow cells 2a, and pressure loss of the honeycomb filter 100 is reduced. In addition, a process of causing wear (erosion) of the plugging portions 5 due to foreign matter flying in exhaust gas flow was studied, and new findings for the plugging portions 5 having the convex portions 6, were obtained as follows. In the plugging portions 5 having the convex portions 6, the erosion resistance of the plugging portions 5 is improved by making the "cross-sectional area 2a of the inflow cells S1" relatively larger than that of the "cross-sectional area S2 of the outflow cells 2b". In particular, when the cross-sectional shape of the inflow cells 2a is octagonal and the cross-sectional shape of the outflow cells 2 is quadrangular, and the area ratio (S1/S2) thereof is 1.40 to 2.20, the erosion resistance of the plugging portions 5 is extremely excellent. Further, by setting the cross-sectional shapes and the area ratio (S1/S2) of the inflow cells 2a and the outflow cells 2b as described above, the smooth inflow of exhaust gas by the convex portions 6 is promoted, and pressure loss of the honeycomb filter 100 can be further reduced.

Further, when the honeycomb filter 100 of the present embodiment, the protruding height H of the convex portions 6 is 0.3 to 3.0 mm, and the plugging depth L of the plugging portions 5 having the convex portions 6 is 4.0 to 9.0 mm, heat capacity of the honeycomb filter 100 including the volume increase due to the convex portions 6 is increased. Therefore, in regeneration process of burning PM deposited inside the honeycomb filter 100, the honeycomb filter 100 is less likely to be damaged, and thermal shock resistance is also excellent.

The inflow cells 2a has an octagonal cross-sectional shape, and the outflow cells 2b has a quadrangular cross-sectional shape. Hereinafter, the "cross-sectional shape" of the inflow cells 2a and the outflow cells 2b may be referred to as a "cell shape". The cell shape of the inflow cells 2a and the outflow cells 2b may be a shape in which corners of polygons (octagons and squares) are formed in a curved shape, for example, a substantially square shape in which corners of squares are formed in a curved shape. Further, when the cell shape of the outflow cells 2b is "square" and the cell shape of the inflow cells 2a is "octagonal", the cell shape of the inflow cells 2a is preferably "octagonal" configured as follows. That is, the cell shape of the inflow cells 2a is preferably an "octagon" formed by enlarging the length of one side of a quadrangle that is the cell shape of the outflow cells 2b by a predetermined length and chamfering the quadrangle of the enlarged quadrangle.

The area ratio (S1/S2) of the cross-sectional area S1 of the inflow cells 2a to the cross-sectional area S2 of the outflow cells 2b is 1.40 to 2.20. When the area ratio (S1/S2) is less than 1.40, pressure loss reduction is low, and it is not expected to sufficiently improve the erosion resistance. When S1/S2 exceeds 2.20, pressure loss increases. S1/S2 is preferably from 1.50 to 2.10, more preferably from 1.70 to 2.10.

The cross-sectional area S1 of the inflow cells 2a and the cross-sectional area S2 of the outflow cells 2b can be measured by performing observations using a scanning electron-microscope (SEM) or a microscope (microscope) and analyzing the obtained images. In addition, the cross-sectional area S1 of the inflow cells 2a and the cross-sectional area S2 of the outflow cells 2b are measured at 10 arbitrarily selected locations, and are each averaged.

In the plugging portions 5, the protruding height H of the convex portions 6 is 0.3 to 3.0 mm, and the plugging depth L is 4.0 to 9.0 mm. When the protrusion height H of the convex portions 6 is less than 0.3 mm, it is not preferable in view of erosion resistance. When the protruding height H of the convex portions 6 exceeds 3.0 mm, it is not preferable in view of purifying performance. The protruding height H of the convex portions 6 is preferably 0.5 to 3.0 mm, and more preferably 0.5 to 2.0 mm. Further, when the plugging depth L is less than 4.0 mm, it is not preferable in view of thermal shock resistance. If the plugging depth L exceeds 9.0 mm, it is not preferable in view of pressure loss. The plugging depth L is preferably 4.0 to 9.0 mm, and more preferably 4.5 to 9.0 mm.

The protruding height H and the plugging depth L of the convex portions 6 can be measured by the following method. The protruding height H can be measured from end face of the honeycomb filter 100 using a scale (SCALE). The plugging depth L is measured by inserting a rod which is longer than the entire length of the honeycomb filter 100 and whose length is known into the cells 2 and calculating the length of the plugging portions 5 (i.e., the plugging depth L) from the differences between the length of the rod exposed from the honeycomb filter 100 and the length of the rod itself. In addition, the protruding height H and the plugging depth L are measured at 10 arbitrarily selected positions, and each averaged to obtain the average values.

The convex portions 6 of the plugging portions 5 may protrude outward in the direction in which the cells 2 extend from the end face where the plugging portions 5 is disposed, and for example, the shape of the convex portions 6 may protrude in any shape such as a hemispherical shape or a pyramid shape. It is to be noted that the top portion of each of the convex portions 6 is preferably one, and the top portion of each of the convex portions 6 is more preferably configured so that a perpendicular line from the top portion down to the bottom portion thereof is closer to the center of the cross section (the center of gravity of the cross section) of the cells 2 in which the plugging portions 5 is disposed. The protruding height H and the plugging depth L of the convex portions 6 may be the same value or may be different values between the plugging portions 5 disposed on the inflow end face 11 and the plugging portions 5 disposed on the outflow end face 12. However, the protruding height H1 and the plugging depth L1 of the plugging portions 5 disposed on the inflow end face 11 of the honeycomb structure body 4, and the protruding height H2 and the plugging depth L2 of the plugging portions 5 disposed on the outflow end face 12 of the honeycomb structure body 4 should satisfy the numerical ranges described above.

In the honeycomb filter 100, the configuration of the honeycomb structure body 4 having the porous partition walls 1 is not particularly limited. However, preferred embodiments of the honeycomb structure body 4 are as follows.

In the honeycomb structure body 4, a thickness of the partition walls 1 is preferably 0.17 to 0.32 mm, and more preferably is 0.20 to 0.30 mm. The thickness of the partition walls 1 can be measured, for example, using a scanning electron-microscope or a microscope. If the thickness of the partition walls 1 is less than 0.17 mm, a satisfactory strength may not be obtained. On the other hand, when the thickness of the partition walls 1 exceeds 0.32 mm, pressure loss of the honeycomb filter 100 may increase.

In the honeycomb structure body 4, a porosity of the partition walls 1 is preferably 50 to 60%, and more preferably 52 to 58%. The porosity of the partition walls 1 is a value measured by the mercury porosimetry. The porosity of the partition walls 1 can be measured using Autopore 9500 (product name) produced by Micromeritics Co, for example. The measurement of the porosity of the partition walls 1 can be carried out by cutting out a portion of the partition walls 1 from the honeycomb structure body 4 to form a sample piece, and using the sample piece thus obtained. The porosity of the partition walls 1 is preferably constant over the entire region of the honeycomb structure body 4.

In the honeycomb structure body 4, a cell density of the cells 2 partitioned by the partition walls 1 is preferably 30 to 62 cells/cm$^2$, more preferably 31 to 62 cells/cm$^2$. The honeycomb filter 100 having this configuration suppresses increase of pressure loss while maintaining the ability of trapping PM.

The circumferential wall 3 of the honeycomb structure body 4 may be configured integrally with the partition walls 1 or may be composed of a circumferential coat layer formed by applying a circumferential coating material to the circumferential side of the partition walls 1. For example, although not shown, the circumferential coat layer can be provided on the circumferential side of the partition walls after the partition walls and the circumferential wall are integrally formed and then the formed circumferential wall is removed by a known method such as grinding, in a manufacturing process.

There is no particular restriction on the shape of the honeycomb structure body 4. Examples of the shape of the honeycomb structure body 4 include a pillar shape in which the inflow end face 11 and the outflow end face 12 have a shape, such as a circle, an ellipse, and a polygon.

The size of the honeycomb structure body 4, e.g., the length from the inflow end face 11 to the outflow end face 12 and the size of a section orthogonal to the extending direction of the cells 2 of the honeycomb structure body 4, is not limited especially. Each size may be selected as appropriate such that optimum purification performance is obtained when the honeycomb filter 100 is used as a filter for purifying exhaust gas.

The material of the partition walls 1 is not limited especially. For example, the material of the partition walls 1 may include a material containing at least one selected from the group consisting of silicon carbide, cordierite, silicon-silicon carbide composite material, cordierite-silicon carbide composite material, silicon nitride, mullite, alumina, and aluminium titanate. The partition walls 1 preferably include these materials in an amount of 90 mass % or more, more preferably 92 mass % or more, and particularly preferably 95 mass % or more. The silicon-silicon carbide composite material is a composite material formed using silicon carbide as a aggregate and silicon as a bonding material. The cordierite-silicon carbide composite material is a composite material formed using silicon carbide as a aggregate and cordierite as a bonding material.

The material of the plugging portions 5 is preferably a material that is preferred as the material of the partition walls 1. The material of the plugging portions 5 and the material of the partition walls 1 may be the same or different.

In the honeycomb filter 100, the partition walls 1 defining the plurality of cells 2 are preferably loaded with a catalyst for purifying exhaust gas. Loading the partition walls 1 with a catalyst refers to coating the catalyst onto the surface of the partition walls 1 and the inner walls of the pores formed in the partition walls 1. This configuration makes it possible to turn CO, NOx, HC and the like in exhaust gas into harmless substances by catalytic reaction. In addition, the oxidation of PM of trapped soot or the like can be accelerated. In the honeycomb filter 100 of the present embodiment, it is particularly preferable that the catalyst is loaded inside the pores of the porous partition walls. With such a configuration, it is possible to achieve both improvement of trap performance and reduction of pressure loss after the catalyst is loaded in a small amount. Further, after the catalytic is loaded, the flow of gases becomes uniform and thus purifying performance can be expected to be improved.

There is no particular restriction on the catalyst with which the partition walls 1 is loaded. For example, a catalyst containing a platinum group element and containing an oxide of at least one element among aluminum, zirconium, and cerium can be exemplified.

2 Manufacturing Method of the Honeycomb Filter

A method for manufacturing the honeycomb filter of the present invention is not limited especially, and the honeycomb filter can be manufactured by the following method, for example. Firstly, a plastic kneaded material is prepared to produce a honeycomb structure body. The kneaded material to produce a honeycomb structure body can be prepared by adding additives, such as binder, pore former and water as needed to a material selected as raw material powder from the aforementioned materials suitable for the partition walls.

Next the prepared kneaded material in this way is extruded, thereby producing a pillar-shaped honeycomb formed body having partition walls defining a plurality of cells and a circumferential wall surrounding this partition walls. In the extrusion, it is possible to employ a die for extrusion whose slits have the inverted shape of the honeycomb formed body to be molded and are provided on the extruded surface for extruding the kneaded material. Here, as the die for extrusion, a die having slits configured to form a honeycomb formed body in which octagonal cells and quadrangular cells are alternately arranged with partition walls interposed therebetween, is used. As for the size of the octagonal cells and the square cells, the size of the respective cells is adjusted so that the area ratio (S1'/S2') between the area S1' of the octagonal cells and the area S2' of the square cells is 1.40 to 2.20. Next, the obtained honeycomb formed body is dried by microwaves and hot air, for example.

Next, the plugging portions are provided at the open ends of the cells of the dried honeycomb formed body. Specifically, for example, a plugging material which includes a raw material to form the plugging portions, is prepared first. Next, a mask is applied to the inflow end face of the honeycomb formed body so as to cover the inflow cells. Next, the open ends of the outflow cells without the mask on the inflow end face of the honeycomb formed body is filled with the prepared plugging material. At this time, it is preferable to fill with a device such as a dropper that enables movement of a predetermined amount of the plugging material. When the plugging material is filled, the plugging material is injected until the plugging material overflows on the inflow end face of the honeycomb formed body so that convex portions are formed on the inflow end face of the honeycomb formed body. By doing so, the convex portions having a protruding height H of 0.3 to 3.0 mm are formed. After that, the outflow end face of the honeycomb formed body also is filled with the plugging material at the open ends of the inflow cells similarly to the above. In addition, when the plugging material is filled, the filling depth of the plugging material is adjusted so that the plugging depth L of the obtained the plugging portions becomes 4.0 to 9.0 mm.

Next, the honeycomb formed body in which the plugging portions are disposed on one of the open ends of the cells is fired to produce a honeycomb filter. The temperature and atmosphere for the firing differ according to the raw material, and those skilled in the art can select the temperature and atmosphere for the firing that are the most suitable for the selected material.

EXAMPLES

The following will describe in more detail the present invention by Examples, but the present invention is not at all limited by these Examples.

Example 1

2 parts by mass of pore former, 2 parts by mass of dispersing medium, and 7 parts by mass of an organic binder were added to 100 parts by mass of cordierite forming raw material and mixed, and then kneaded to prepare a kneaded material. As the cordierite forming raw material, alumina, aluminum hydroxide, kaolin, talc, and silica were used. As the dispersing medium, water was used. As the organic binder, methylcellsulose was used. As the dispersing agent, dextrin was used. As the pore former, water absorptive polymer having the average particle diameter of 20 μm was used. In the present Example, the average particle diameter of the respective raw material is the particle size (D50) at an integrated value of 50% in the particle size distribution determined by the laser diffractometry and scattering method.

Next, the kneaded material was extruded using a die for manufacturing of a honeycomb formed body to obtain a honeycomb formed body having a round pillar shape as an overall shape. The cells of the honeycomb formed body were configured to be octagonal and square, and these octagonal and square cells were configured to arranged alternately with partition walls interposed therebetween.

Next, this honeycomb formed body was dried by a microwave dryer, and then was dried completely by a hot-air drier, and then both end faces of the honeycomb formed body were cut so as to have predetermined dimensions.

Next, a plugging material was prepared to form the plugging portions. Specifically, water, a binder, and the like were added to the ceramic raw material to prepare a slurry-like plugging material. As the ceramic raw material, for example, cordierite forming raw material or the like used in the production of the honeycomb formed body can be used. Thereafter, a plugging material was used to form the plugging portions on open ends of the predetermined cells on the inflow end face of the dried honeycomb formed body and on open ends of the remaining cells on the outflow end face of the dried honeycomb formed body. The plugging portions were formed in such a manner that the cells having an octagonal cell shape became inflow cells and the cells having a square cell shape became outflow cells.

Next, the honeycomb formed body on which the respective the plugging portions were formed was subjected to degreasing and fired to produce a honeycomb filter of Example 1.

The honeycomb filter of Example 1 had a round pillar shape, where the inflow end face and the outflow end face were round. The inflow end face and the outflow end face had a diameter of 267 mm. Further, the length of the cells of the honeycomb filter in the extending direction was 178 mm. In the honeycomb filter of Example 1, the cell shape (cross-sectional shape) of the inflow cells was octagonal, and the cell shape (cross-sectional shape) of the outflow cells was quadrangular. The partition walls had a thickness of 0.26 mm, cell density of 47 cells/cm$^2$, and a porosity of 55% of partition walls. The porosity of the partition walls was measured using Autopore 9500 (product name) produced by Micromeritics. Table 1 shows the results.

The cross-sectional area S1 of the inflow cells and the cross-sectional area S2 of the outflow cells were measured by observing using a scanning electron-microscope (SEM) or a microscope (microscope) and analyzing the obtained images. Based on the measured data, the area ratio (S1/S2) of the cross-sectional area S1 of the inflow cells to the cross-sectional area S2 of the outflow cells was calculated. The calculated area fraction (S1/S2) of the cells was 1.70. Table 1 shows the result.

The plugging portions that seal the ends of the cells had convex portions that protrude outward from the end faces where the plugging portions were disposed. The protruding height H of the convex portions of the plugging portions was 2.0 mm. Further, the plugging depth L of the respective the plugging portions was 7.0 mm. Table 1 shows the results.

TABLE 1

| | Protruding height H of plugging portion (mm) | Plugging depth L of plugging portion (mm) | Area ratio of cells (S1/S2) | Cross-sectional shape of inflow cells | Cross-sectional shape of outflow cells | Thickness of partition walls (mm) | Cell density (cells/cm$^2$) | Porosity (%) |
|---|---|---|---|---|---|---|---|---|
| Comparative Example 1 | 1.0 | 5.0 | 1.00 | Square | Square | 0.27 | 39 | 56 |
| Comparative Example 2 | 0.0 | 6.0 | 1.00 | Square | Square | 0.25 | 29 | 52 |
| Comparative Example 3 | 4.0 | 10.0 | 1.56 | Octagon | Square | 0.19 | 39 | 54 |

TABLE 1-continued

|  | Protruding height H of plugging portion (mm) | Plugging depth L of plugging portion (mm) | Area ratio of cells (S1/S2) | Cross-sectional shape of inflow cells | Cross-sectional shape of outflow cells | Thickness of partition walls (mm) | Cell density (cells/cm$^2$) | Porosity (%) |
|---|---|---|---|---|---|---|---|---|
| Comparative Example 4 | 1.0 | 3.0 | 1.56 | Octagon | Square | 0.19 | 39 | 54 |
| Comparative Example 5 | 1.0 | 6.0 | 2.31 | Octagon | Square | 0.33 | 62 | 61 |
| Example 1 | 2.0 | 7.0 | 1.70 | Octagon | Square | 0.26 | 47 | 55 |
| Example 2 | 2.0 | 8.0 | 1.63 | Octagon | Square | 0.30 | 39 | 54 |
| Example 3 | 0.5 | 9.0 | 1.74 | Octagon | Square | 0.22 | 54 | 52 |
| Example 4 | 1.0 | 4.0 | 2.10 | Octagon | Square | 0.23 | 62 | 54 |
| Example 5 | 1.0 | 9.0 | 1.70 | Octagon | Square | 0.28 | 31 | 55 |

The honeycomb filters of Example 1 were evaluated for "pressure loss", "erosion resistance" and "thermal shock resistance" in the following manner. Table 2 shows the results.

[Pressure loss] Exhaust gas discharged from 6.7 L diesel engine was flowed into the honeycomb filters of the respective Example and comparative examples, and the partition walls of the honeycomb filter were used to trap soot in exhaust gas. The soot trap was performed until the soot deposit per unit volume (1L) of the honeycomb filter was 5 g/L. Then, exhaust gas at 200° C. was flowed into the honeycomb filter at a flow rate of 12 m$^3$/min while the soot deposit was 5 g/L, and the pressures of the honeycomb filter on the inflow end face side and the outflow end face side were measured. Then, the pressure loss (kPa) of each of the honeycomb filters was determined by calculating the pressure difference between the inflow end face side and the outflow end face side. Then, when pressure loss of the honeycomb filter of Comparative Example 1 was set to 100%, pressure loss ratio (%) of each honeycomb filter was calculated, and the honeycomb filter of each of Examples and Comparative Examples was evaluated based on the following evaluation criteria. In the following criteria, "pressure loss ratio (%)" refers to the ratio (%) of pressure loss of the honeycomb filter when pressure loss of the honeycomb filter of Comparative Example 1 is set to 100%.

Evaluation "excellent": When pressure loss ratio (%) is 80% or less, it is "excellent".

Evaluation "good": When pressure loss ratio (%) is more than 80% and not more than 90%, it is "good".

Evaluation "passing": When pressure loss ratio (%) is more than 90% and not more than 100%, it is "passing".

Evaluation "failing": When pressure loss ratio (%) exceeds 100%., it is "failing".

[Erosion resistance] First, the honeycomb filter was canned into a can body, and the canned honeycomb filter was placed in a gas burner testing machine. Next, abrasive grains made of SiC are caused to collide with the inflow end face of the honeycomb filter by the gas burner testing machine. The conditions for causing the abrasive grains to collide were as follows. The input abrasive grains were used as 5 g. The temperature of the gas flowing into the honeycomb filter was 700° C. The flow rate of the gases flowing into the honeycomb filter was defined as 120 m/s. The test time was 10 minutes, during which the abrasive grains were gradually put in. Thereafter, the honeycomb filter was taken out, and the honeycomb filter taken out was photographed by tomography (CT), and the depth (erosion depth (mm)) of the honeycomb filter scraped by the collision of the abrasive grains was calculated. In this test, abrasive grains having an average particle diameter of 50 micrometers were used. The "erosion resistance" of the honeycomb filter was evaluated according to the following evaluation criteria.

Evaluation "OK": When the erosion depth of the evaluation target is smaller than the erosion depth of Comparative Example 1, it is passing (OK).

Evaluation "NG": When the erosion depth of the evaluation target is larger than the erosion depth of Comparative Example 1, it is failing (NG).

[thermal shock resistance] First, a predetermined amount of soot was generated in an engine bench equipped with a 6.7 L diesel engine under a predetermined operating condition, and the generated soot was deposited on the partition walls of the honeycomb filter of each of Examples and the Comparative Examples. Next, regeneration processing by post-injection was performed to increase the inlet gas temperature of the honeycomb filter, and when pressure loss between the upper stream side and the lower stream side of the honeycomb filter started to decrease, the post-injection was turned off and the engine was switched to the idle state. The above procedure was repeated until cracks occurred in the honeycomb filter by gradually increasing the predetermined amount of soot deposited prior to the regeneration processing. The amount of soot deposition in which cracks occur in the honeycomb filter was defined as the "amount of soot deposition limit" in each honeycomb filter. The honeycomb filters each of Examples and Comparative Examples was evaluated based on the following evaluation criteria.

Evaluation "excellent": When the "amount of soot deposition limit" of Comparative Example 1 is 100%, and when the "amount of soot deposition limit" of the evaluation target is 110% or more, it is "excellent".

Evaluation "good": When the "amount of soot deposition limit" of Comparative Example 1 is 100%, and when the "amount of soot deposition limit" of the evaluation target is 105% or more and less than 110%, it is "good".

Evaluation "passing": When the "amount of soot deposition limit" of Comparative Example 1 is 100%, and when the "amount of soot deposition limit" of the evaluation target is 100% or more and less than 105%, it is "passing".

Evaluation "failing": When the "amount of soot deposition limit" of Comparative Example 1 is set to 100%, and when the "amount of soot deposition limit" of the evaluation target is less than 100%, it is "failing".

TABLE 2

|  | Pressure loss Evaluation | Erosion resistance Evaluation | Thermal shock resistance Evaluation |
|---|---|---|---|
| Comparative Example 1 | Standard | Standard | Standard |
| Comparative Example 2 | Failing | NG | Failing |
| Comparative Example 3 | Excellent | OK | Failing |
| Comparative Example 4 | Excellent | NG | Failing |
| Comparative Example 5 | Failing | OK | Excellent |
| Example 1 | Good | OK | Good |
| Example 2 | Passing | OK | Excellent |
| Example 3 | Excellent | OK | Good |
| Example 4 | Excellent | OK | Passing |
| Example 5 | Passing | OK | Good |

Examples 2 to 5 and Comparative Examples 1 to 5

Honeycomb filters were manufactured in the same manner as the honeycomb filter of Example 1 except that configurations of the honeycomb filter were changed as shown in Table 1.

The honeycomb filters of Examples 2 to 5 and Comparative Examples 1 to 5 were also evaluated for "pressure loss", "erosion resistance", and "thermal shock resistance" in the same manner as in Example 1. Table 2 shows the results.

Results

It was confirmed that the honeycomb filters of Examples 1 to 5 were superior to the respective performances of the honeycomb filter of Comparative Example 1 as a standard in evaluating pressure loss, erosion resistance, and thermal shock resistance. On the other hand, the honeycomb filters of Comparative Examples 2 to 5 were inferior in pressure loss or erosion resistance or thermal shock resistance as compared with the honeycomb filters of Examples 1 to 5.

INDUSTRIAL APPLICABILITY

The honeycomb filter of the present invention can be used as a filter to trap particulate matter in exhaust gas.

Description of Reference Numerals

1: partition wall, 2: cell, 2a: inflow cell, 2b: outflow cell, 3: circumferential wall, 4: honeycomb structure body, 5: plugging portion 6: convex portions, 11: inflow end face, 12: outflow end face, 100: honeycomb filter, H, H1 and H2: protrusion height, L, L1 and L2: plugging depth, S1 and S2: cross-sectional area (cells cross-sectional area).

What is claimed is:

1. A honeycomb filter comprising:
   a honeycomb structure body that is pillar-shaped and has porous partition walls disposed so as to surround a plurality of cells each of which serves as a fluid through channel extending from an inflow end face of the honeycomb structure body to an outflow end face of the honeycomb structure body, and
   plugging portions that are disposed at any one of the ends of the plurality of cells on the inflow end face and the ends of the plurality of cells on the outflow end face, wherein,
   a cell density of the honeycomb structure body is 47 to 54 cells/cm$^2$,
   when cells of the plurality of cells having the plugging portions at the ends on the inflow end face are defined as outflow cells and cells of the plurality of cells having the plugging portions at the ends on the outflow end face are defined as inflow cells,
   in a cross section perpendicular to an extending direction of the plurality of cells of the honeycomb structure body, a cross-sectional shape of each of the inflow cells is octagonal and a cross-sectional shape of each of the outflow cells is quadrangular, except for cells of the plurality of cells disposed in outermost circumference of the honeycomb structure body,
   an area ratio (S1/S2) of a cross-sectional area S1 of each of the inflow cells having the octagonal cross-sectional shape to a cross-sectional area S2 of each of the outflow cells having the rectangular cross-sectional shape is 1.70 to 1.74,
   the plugging portions that seal the ends of the inflow cells each having the octagonal cross-sectional shape and the outflow cells each having the rectangular cross-sectional shape, have convex portions that protrude outwardly from the inflow end face and the outflow end face of the honeycomb structure body on which the plugging portions are disposed in the extending direction of the plurality of cells,
   the convex portions have a protruding height H of 0.3 to 3.0 mm when the inflow end face and the outflow end face of the honeycomb structure body are considered as bottoms of the convex portions, and the plugging portions having the convex portions have a plugging depth L of 4.0 to 9.0 mm when the inflow end face and the outflow end face of the honeycomb structure body are considered as starting points of the plugging portions,
   a bottom surface of a portion of each plugging portion extending into a cell has a flat shape that is parallel to the inflow end face and the outflow end face, and extends between each of the partition walls surrounding the cell, and
   each plugging portion is solid from the bottom surface to a surface of the protruding portion of the plugging portion.

2. The honeycomb filter according to claim 1, wherein a thickness of the partition walls is 0.17 to 0.32 mm.

3. The honeycomb filter according to claim 1, wherein a porosity of the partition walls is 50 to 60%.

* * * * *